United States Patent
Mehta et al.

(10) Patent No.: US 9,479,804 B2
(45) Date of Patent: Oct. 25, 2016

(54) DIGITAL VIDEO RECORDER PROGRAM TO MOBILE DEVICE

(75) Inventors: Japan A. Mehta, Coppell, TX (US); Shafiq Kassam, Lewisville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 90 days.

(21) Appl. No.: 13/598,674

(22) Filed: Aug. 30, 2012

(65) Prior Publication Data

US 2014/0068684 A1 Mar. 6, 2014

(51) Int. Cl.
| | |
|---|---|
| H04N 7/16 | (2011.01) |
| H04N 5/445 | (2011.01) |
| H04N 21/2343 | (2011.01) |
| H04N 21/258 | (2011.01) |
| H04N 21/414 | (2011.01) |
| H04N 21/472 | (2011.01) |

(52) U.S. Cl.
CPC .... *H04N 21/2343* (2013.01); *H04N 21/25825* (2013.01); *H04N 21/41407* (2013.01); *H04N 21/47214* (2013.01)

(58) Field of Classification Search
CPC .............. H04N 21/43637; H04N 21/43615; H04N 21/4147; H04N 21/4627; H04N 21/84; H04N 5/76; H04N 9/8042; H04N 21/4402; H04N 19/43; H04N 19/61; H04N 21/2541; H04N 21/26613; H04N 21/2743; H04N 21/4108; H04N 21/4126; H04N 5/765; H04N 21/4828; H04N 21/440236; H04N 21/25841; H04N 5/775; H04N 7/17318; H04N 5/783; H04N 21/26283; H04N 21/47214; H04N 21/482; H04N 21/6143; H04N 21/6581
USPC .......... 725/37, 62, 68, 100, 110, 139, 80–85
See application file for complete search history.

(56) References Cited

U.S. PATENT DOCUMENTS

| | | | |
|---|---|---|---|
| 7,344,084 B2 * | 3/2008 | DaCosta ................. 235/472.01 |
| 7,861,262 B1 * | 12/2010 | Gutman ......................... 725/37 |
| 2004/0237104 A1 * | 11/2004 | Cooper et al. .................. 725/38 |
| 2006/0258289 A1 * | 11/2006 | Dua ............................ 455/41.3 |
| 2007/0157241 A1 * | 7/2007 | Walker ........................... 725/46 |
| 2009/0031345 A1 * | 1/2009 | Vagnati .......................... 725/39 |
| 2009/0317065 A1 * | 12/2009 | Fyock et al. ................. 386/124 |
| 2012/0141092 A1 * | 6/2012 | Friedman ..................... 386/248 |
| 2012/0324493 A1 * | 12/2012 | Holmdahl et al. .............. 725/12 |

* cited by examiner

*Primary Examiner* — Pankaj Kumar
*Assistant Examiner* — Alazar Tilahun

(57) ABSTRACT

Method, device, and storage medium to provide programs, recorded and stored in relation to a digital video recorder (DVR) service, to a mobile device. A mobile device includes a mobile DVR application that provides for the automatic downloading or streaming of the programs. A network device provides transcoding of the programs to a format compatible with the mobile device. The mobile DVR application allows the user to set preferences pertaining to the invocation and delivery of the programs.

20 Claims, 6 Drawing Sheets

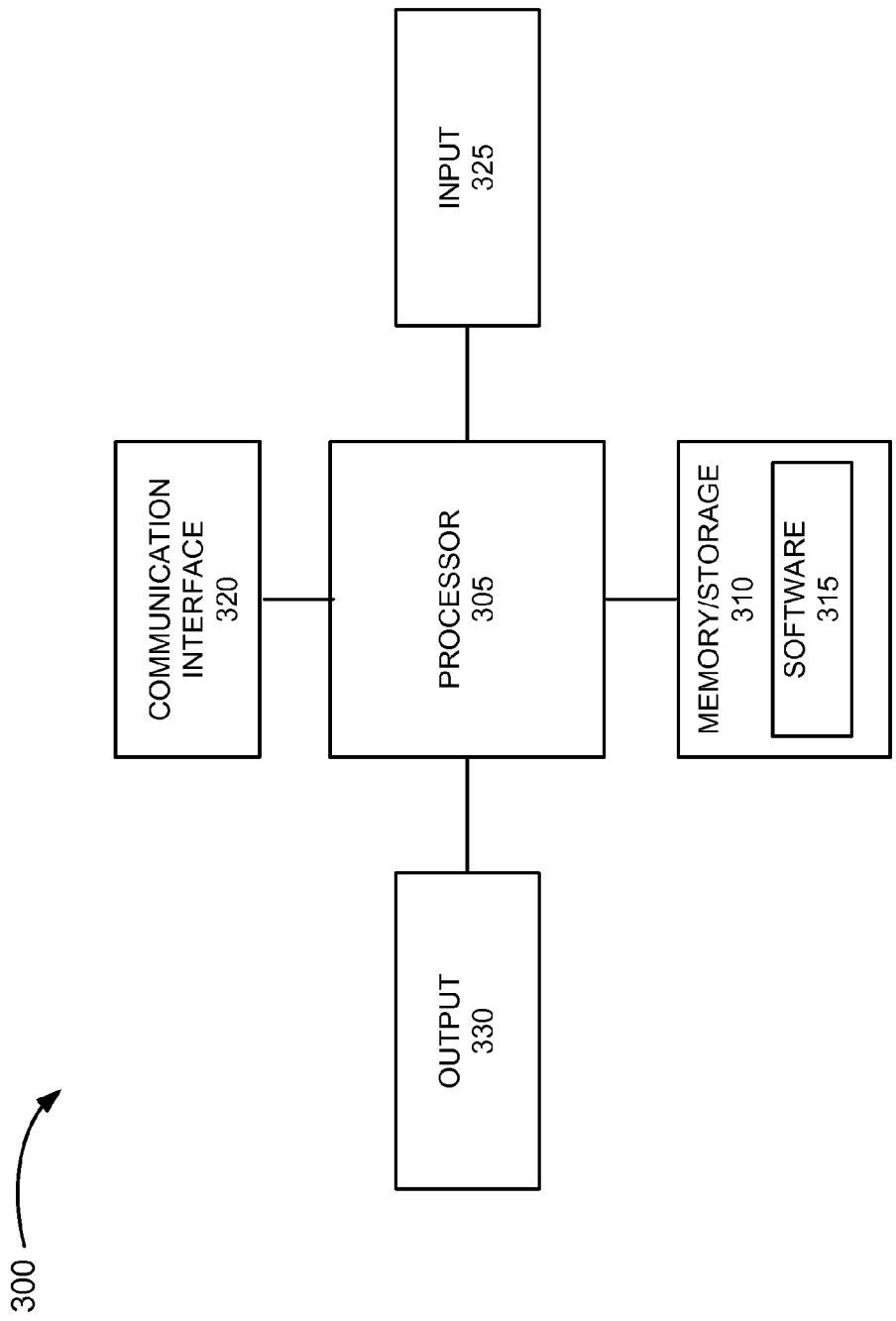

DIGITAL VIDEO RECORDER PROGRAM TO MOBILE DEVICE

BACKGROUND

Program service providers, such as television service providers, offer users an array of programs to view and record. For example, set top boxes allow users to record programs based on a digital video recorder (DVR) service. The set top boxes include storage media (e.g., hard drives) to store the recorded programs.

DESCRIPTION OF THE DRAWINGS

FIG. 3 is a diagram illustrating exemplary components of a device that may correspond to one or more of the devices previously depicted.

DETAILED DESCRIPTION

Figure 1:
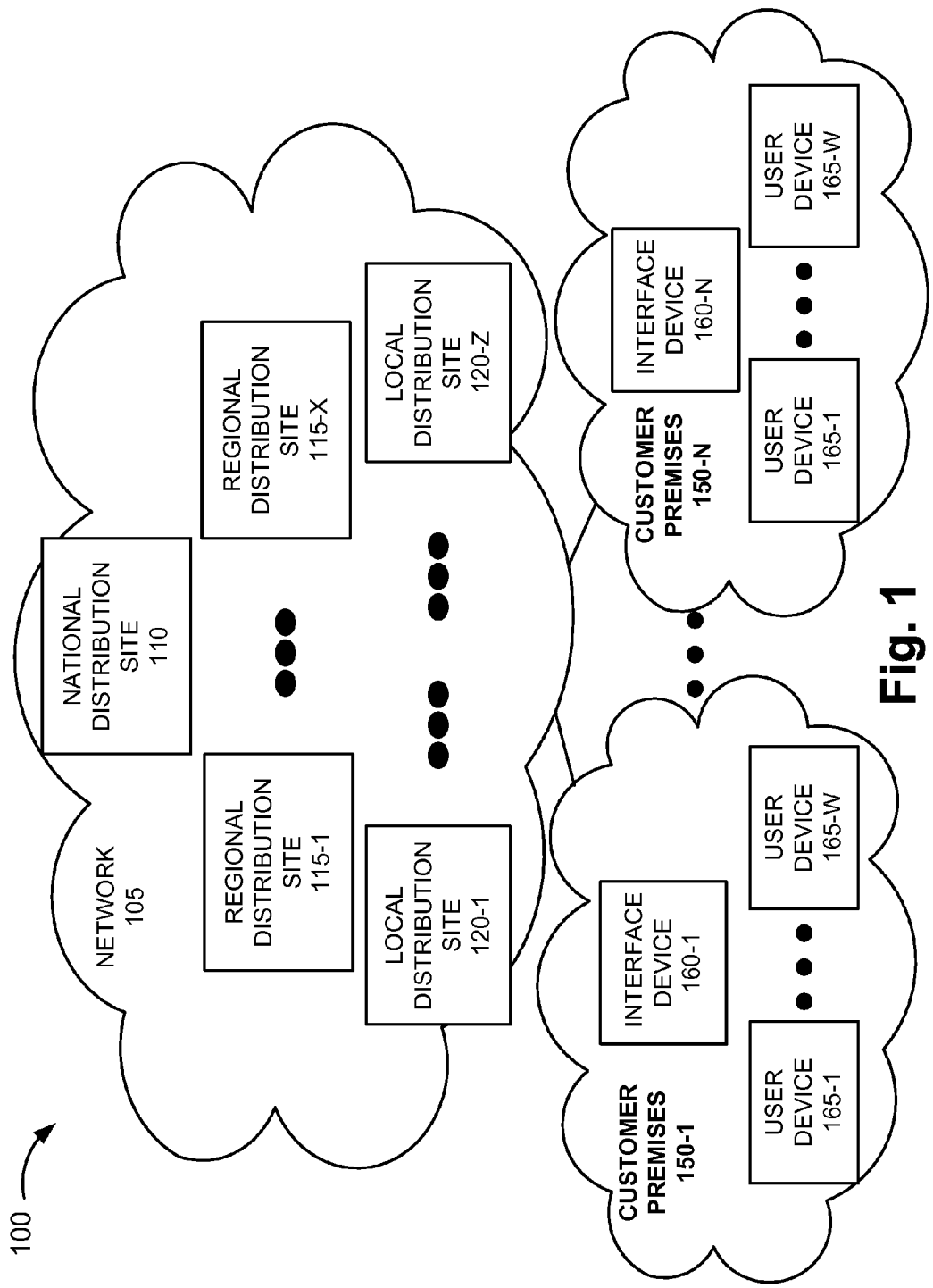
FIG. 1 is a diagram illustrating an exemplary environment in which an exemplary embodiment of DVR program to mobile device may be implemented.

The following detailed description refers to the accompanying drawings. The same reference numbers in different drawings may identify the same or similar elements.

The term "DVR program" includes video and/or audio content, multimedia content, and digital content (e.g., DVR content, etc.).

According to an exemplary embodiment, a program delivery system includes a customer premises device that stores DVR programs on behalf of a user. The customer premises device provides a DVR service and stores the DVR programs in a format that is incompatible with a mobile device. According to an exemplary embodiment, the customer premises device provides a DVR program to a network device in response to a triggering event. For example, the triggering event may be when the user enters his/her residence or some other user-configured triggering event. In response to obtaining the DVR program, the network device transcodes the DVR program into a format that is compatible with the mobile device. The mobile device obtains the DVR program from the network device. For example, the mobile device may download or receive a stream of the DVR program.

According to an exemplary embodiment, a program delivery system includes a network device that stores DVR programs on behalf of users. According to an exemplary embodiment, a user indicates, via a mobile device, a user preference as to which DVR programs the user wishes to obtain from the network device. The network device stores only those DVR programs indicated by the user preference. In this way, the number of DVR programs stored by the network device is reduced. For example, a user may decide to store some DVR programs on a customer premises device (e.g., a set top box) and other DVR programs on the network device. According to an exemplary use case, when a user with the mobile device enters his/her residence, the mobile device automatically syncs up with the network device to download or stream the DVR program that is stored by the network device according to the user preference.

According to an exemplary embodiment, a program delivery system includes a network device that stores DVR programs on behalf of users. According to an exemplary embodiment, the network device stores a pool of DVR programs in which a single copy of each DVR program is stored. The network device stores multiple copies of the DVR program only if the network device receives simultaneous requests for the same DVR program from multiple mobile devices. In other words, the network device stores a copy of a DVR program for each active user requesting to download or stream the DVR program.

According to an exemplary embodiment, a program delivery system includes a network device that stores DVR programs on behalf of users. According to an exemplary embodiment, the network device stores a pool of DVR programs in which a single copy of each program is stored for all users. In response to a user request, via a mobile device, the network device generates a copy of the DVR program and streams, downloads, or side-loads that copy of the DVR program to the mobile device. Upon completion of the streaming, downloading, or side-loading, the generated copy of the DVR program is deleted.

According to an exemplary embodiment, a program delivery system includes a network device that stores DVR programs on behalf of users. According to an exemplary embodiment, the network device stores a number of copies of the DVR programs in correspondence to a number of users that have enabled the DVR program to mobile device service. Upon completion of a stream or a download, the copy of the DVR program is deleted from the network device.

While exemplary embodiments provided in this description may be implemented based on the use of a particular network architecture, platform, etc., such implementations are not intended to be restrictive or provide an exhaustive treatment, as such. In other words, the embodiments described herein may be implemented using other suitable network architectures, platforms, etc., which may not be specifically described.

FIG. 1 is a diagram illustrating an exemplary environment in which an exemplary embodiment of DVR program to mobile device may be implemented. As illustrated in FIG. 1, environment 100 includes network 105 and customer premises 150-1 through 150-N (also referred to collectively and individually as customer premises 150). Network 105 includes a national distribution site 110, regional distribution sites 115-1 through 115-X, in which X>1 (also referred to collectively as regional distribution sites 115 or individually as regional distribution site 115), and local distribution sites 120-1 through 120-Z, in which Z>1 (also referred to collectively as local distribution sites 120 or individually as local distribution site 120). Customer premises 150 include interface devices 160-1 through 160-N, in which N>1 (also referred to collectively as interface devices 160 or individually as interface device 160) and user devices 165-1 through 165-W, in which W>1 (also referred to collectively as user devices 165 or individually as user device 165).

The number of devices, the number of networks, and the configuration in environment 100 are exemplary and provided for simplicity. According to other embodiments, environment 100 may include additional devices, fewer devices, different devices, and/or differently arranged devices, than those illustrated in FIG. 1. Additionally, or alternatively, environment 100 may include an additional network and/or a differently arranged network than the network illustrated in FIG. 1.

According to other embodiments, a single device in FIG. 1 may be implemented as multiple devices. For example, interface device 160 may be implemented as multiple devices. Additionally, or alternatively, according to other embodiments, multiple devices may be implemented as a single device. For example, interface device 160 and user device 165 may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, a proxy device, or a combination thereof). Also, according to other embodiments, one or more functions and/or processes described as being performed by a particular device may be performed by a different device, or some combination of devices, which may or may not include the particular device.

Environment 100 may be implemented to include wired and/or wireless connections among the devices and the network illustrated. A connection may be direct, or indirect and involve intermediary device(s) and/or network(s) not illustrated in FIG. 1.

Network 105 includes a network that provides the functionality of DVR program to mobile device, as described herein. Network 105 may include a network that distributes or makes available programs. For example, according to an exemplary embodiment, network 105 may be implemented as a television distribution network (e.g., a terrestrial-based network, etc.). Network 105 may include or connect to other network(s) that provide other services, such as a mobile service or an Internet service. For example, network 105 may include or connect to a mobile network or the Internet.

National distribution site 110 includes devices to distribute programs to a national area. Regional distribution site 115 includes devices to distribute programs to a regional area. Local distribution site 120 includes devices to distribute programs to a local area. For example, national distribution site 110 may be implemented as a super headend; regional distribution site 115 may be implemented as a video hub office; and/or local distribution site 120 may be implemented as a video switching office. National distribution site 110, regional distribution site 115, and/or local distribution site 120 may include various devices, such as, for example, media servers, search servers, load balancers, databases, and transport devices (e.g., routers, switches, etc.). Alternatively, national distribution site 110, regional distribution site 115, and/or local distribution site 120 may be implemented as other types of infrastructures (e.g., satellite distribution, stand-alone, etc.), which may or may not include national, regional, and/or local sites that provide, for example, program acquisition (e.g., a content center), program processing, and program distribution.

According to an exemplary embodiment, national distribution site 110, regional distribution site 115, and/or local distribution site 120 include(s) one or multiple network devices including functionality pertaining to a DVR program to mobile device service, as described herein. According to other embodiments, the one or multiple network devices may reside outside of sites 110, 115, and/or 120, belong to a network other than network 105, etc.

Each customer premises 150 corresponds to a location where a customer receives service from network 105. For example, the customer may receive service at home, at work, or at another location.

Interface device 160 includes a device that communicates with network 105 to receive programs. Interface device 160 provides the programs to user devices 165. By way of example, interface device 160 may be implemented as a media server device or a set top box. A set top box may be implemented as a client device, a thin client device, a converter box, a program receiver device, a server device, a peer device, a tuner device, and/or a digibox. According to an exemplary implementation, interface device 160 is capable of recording and storing programs for users in accordance with a DVR service. According to an exemplary embodiment, interface device 160 includes functionality pertaining to a DVR program to mobile device service, as described herein.

User device 165 includes a device that communicates with interface device 160, network 105, and/or consumes programs (including DVR programs). For example, user device 165 may be implemented as a television, a mobile device (e.g., a smartphone, a tablet device, a personal digital assistant (PDA), a personal communication system (PCS), a vehicular communication system, etc.), a computer (e.g., a desktop computer, a laptop computer, a palmtop computer, a netbook, etc.), a game system (e.g., a PS3® device, etc.), or other types of user devices capable of receiving programs.

Figure 2A:
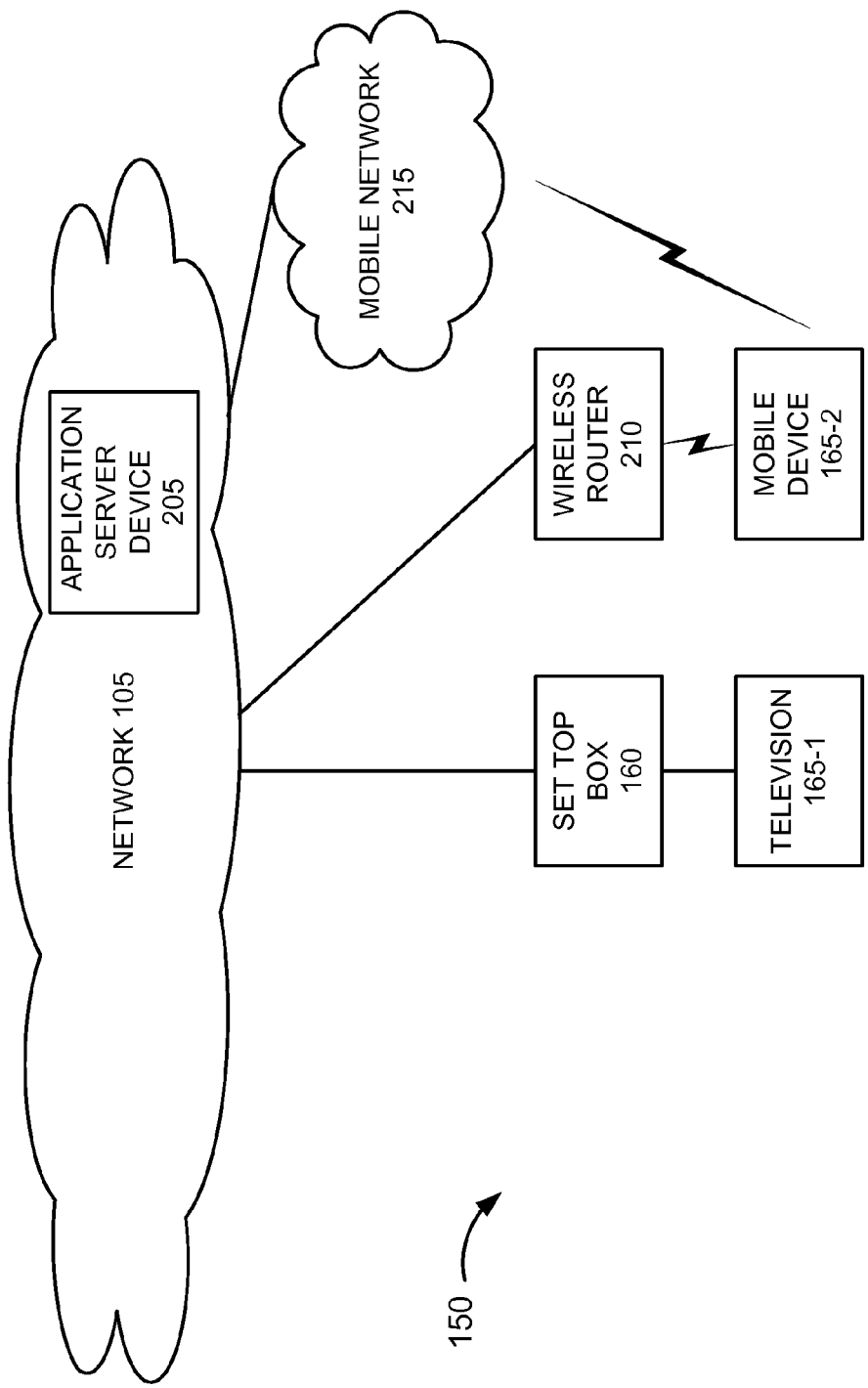
FIGS. 2A-2C are diagrams illustrating exemplary environments in which exemplary scenarios pertaining to DVR program to mobile device are described.

FIG. 2A is a diagram illustrating an exemplary environment in which an exemplary scenario pertaining to DVR program to mobile device is described. As illustrated, according to an exemplary embodiment, network 105 includes an application server device 205. Application server device 205 performs DVR program to mobile device processes, as described herein. By way of example, application server device 205 may be implemented as a computer or other suitable network device. Application server device 205 may reside outside of national distribution site 110, regional distribution sites 115, and local distribution sites 120, or may be implemented as a network device within one or more of the distribution sites. Alternatively, application server device 205 may not be a part of network 105. For example, application server device 205 may be a Web device in the Internet or a device in a cloud.

As further illustrated, at customer premises 150, interface device 160 (e.g., set top box 160) is connected to user device 165-1 (e.g., television 165-1). Customer premises 150 also includes user device 165-2 (e.g., mobile device 165-2). According to an exemplary embodiment, mobile device 165-2 includes a mobile DVR application. When executed, the mobile DVR application provides a user with various interfaces and functionalities, as described herein. According to an exemplary implementation, mobile device 165-2 may communicate with application server device 205 via a wireless router 210 or via mobile network 215.

According to an exemplary scenario, assume that a user is carrying mobile device 165-2 and enters his/her residence (e.g., customer premises 150). Also assume that the mobile DVR application is running in the background on mobile device 165-2.

According to this scenario, assume that set top box 160 is a legacy device that stores DVR programs that have been recorded (e.g., based on a DVR service) on behalf of the user in a format that is incompatible with mobile device 165-2. By way of example, set top box 165-2 stores the programs in a Moving Picture Experts Group 2 (MPEG-2) format and mobile device 165-2 needs the DVR programs to be in an H.264 format to allow mobile device 165-2 to provide the DVR programs to the user.

According to an exemplary implementation, when the user enters his/her residence, the mobile DVR application detects wireless router 210 (e.g., a WiFi network of customer premises 150). In response to this detection, the mobile DVR application generates and transmits a DVR request to application server device 205.

According to an exemplary implementation, the DVR request includes information that indicates a compatible format for mobile device 165-2 to consume the DVR programs stored by set top box 160. For example, the DVR request includes information to indicate that the compatible program format for mobile device 165-2 is H.264. The DVR request includes information that indicates a DVR program (e.g., one or multiple DVR programs) to be provided to mobile device 165-2. The DVR request may also include other information pertaining to mobile device capabilities (e.g., display size, display resolution, audio capabilities, operating system (OS), media player, etc.).

According to other implementations, the DVR request may not include certain types of information. For example, application server device 205 may obtain mobile device capability information and format information during a setup process for the DVR program to mobile device service. Application server device 205 stores this information (e.g., in a database or a data structure). The information may be mapped to an equipment identifier that uniquely identifies mobile device 165-2 or log-in information.

According to an exemplary embodiment, when application server device 205 receives the DVR request, application server device 205 generates and transmits a DVR request to set top box 160. The DVR request may include program information identifying the DVR program to be provided by set top box 160. When received by set top box 160, the DVR request causes set top box 160 to automatically provide the DVR program to application server device 205. As application server device 205 receives the DVR program, application server device 205 transcodes the DVR program into a format compatible with mobile device 165. For example, application server device 205 transcodes the DVR program from the MPEG-2 format to the H.264 format. Application server device 205 downloads or streams the transcoded DVR program to mobile device 165-2 via wireless router 210. Upon completion of a download process, the mobile DVR application generates a message that the download is complete and that the DVR program is available. The mobile DVR application causes the message to be displayed on a display of mobile device 165-2.

According to another exemplary implementation, when the user enters his/her residence, the mobile DVR application recognizes the location of the user. For example, mobile device 165-2 may include a GPS receiver. Alternatively, other location-aware methods may be implemented and the mobile DVR application may obtain the location information. As described further below, according to an exemplary embodiment, the mobile DVR application provides a user interface to allow the user to set a user preference. For example, a user preference may include the address/coordinates of a location that causes a DVR program to mobile device service to initiate.

In a manner similar to that previously described, upon obtaining the location information, the mobile DVR application generates and transmits a DVR request to application server device 205 via mobile network 215. When application server device 205 receives the DVR request, mobile device 165-2 receives the DVR program, as previously described.

According to an exemplary embodiment, the mobile DVR application provides a user interface to allow the user to configure various parameters pertaining to the DVR program to mobile device service. For example, as previously described, the mobile DVR application allows the user to store locations. A location may be used by the mobile DVR application as a triggering mechanism to initiate or invoke the DVR program (e.g., by generating and transmitting a DVR request) to mobile device service. According to another implementation, the mobile DVR application allows the user to store times (e.g., date, day, hour, etc.) or time windows (e.g., 12:00 p.m.-1:00 p.m., etc.) to serve as a triggering mechanism, or a combination of time and location (e.g., Monday, Aug. 8, 2012, 7:30 a.m., Greenville subway station).

According to an exemplary embodiment, the mobile DVR application allows the user to store preferences pertaining to the DVR programs to be downloaded. For example, the user may use a DVR service to record various types of programs. However, the user may wish to view only certain programs on mobile device 165-2. The user may specify the programs that the user wishes to be consumed on mobile device 165-2. As an example, the user schedules a recording of a program via set top box 160. The set top box 160 provides a user interface that allows the user to designate a program for mobile device consumption.

According to an exemplary implementation, set top box 160 uses this information to select the appropriate DVR program to provide application server device 205 when set top box 160 receives a DVR request. Alternatively, as previously described, mobile device 165-2 may provide this information to application server device 205 in the DVR request, and in turn, application server 205 identifies the DVR program in the DVR request to set top box 160. According to yet another exemplary implementation, when the user designates a program for mobile device consumption, set top box 160 generates and transmits a DVR request that includes DVR scheduling information (e.g., day, time, program identifier) to application server device 205. In response to receiving the DVR request, application server device 205 records, transcodes, and stores the DVR program. When application server device 205 receives a DVR request from mobile device 165-2, application server device 205 provides the DVR program to mobile device 165-2.

According to an exemplary implementation, the mobile DVR application selects the format suitable for mobile device 165-2. For example, during a setup process, the mobile DVR application automatically determines the capabilities of mobile device 165-2 and/or based on prompts to and answers from a user, via a user interface, regarding the capabilities of mobile device 165-2, determines the capabilities of mobile device 165-2. The mobile DVR application selects the appropriate format for DVR programs based on this determination.

According to an exemplary embodiment, the mobile DVR application stores a user preference pertaining to whether the program is to be streamed or downloaded. When the DVR program to mobile device service is invoked, the DVR request may include information indicating whether the program is to be downloaded or streamed to mobile device 165-2. According to another embodiment, application server device 205 stores the user preference.

According to an exemplary embodiment, the mobile DVR application allows the user to store a DVR program queue pertaining to the DVR programs to be downloaded or streamed. For example, the mobile DVR application provides a user interface to allow the user to manage the order in which DVR programs are downloaded or streamed. The mobile DVR application may generate and transmit a DVR program queue update request to application server device 205. The mobile DVR application updates the DVR program queue based on receiving a DVR program queue update response from application server device 205. The mobile DVR application adds newly available DVR programs to the bottom of the DVR program queue and flags these DVR programs. In this way, the user is alerted as to which DVR programs have been managed and which DVR programs have not been managed by the user.

According to an exemplary embodiment, the mobile DVR application may use a user preference to determine whether to allow the downloading of a DVR program. By way of example, the mobile DVR application may store a user preference pertaining to the amount of storage allocated to store DVR programs on mobile device 165-2. In this way, the user may set a limit as to the amount of storage for DVR programs. By way of example, if the allocated storage space usage is below a certain threshold value (e.g., a percentage of the total storage space allocated), the mobile DVR application invokes the DVR program to mobile device service. However, if the allocated storage space usage is above a threshold value, the mobile DVR application obtains from application server device 205, if not already known, information as to whether an available DVR program is to be downloaded or streamed. For example, the mobile DVR application generates and transmits a DVR query. If the available DVR program is to be streamed, then the allocated storage space limit is rendered moot. However, if the available DVR program is to be downloaded, the mobile DVR application may prevent the download from occurring. For example, the mobile DVR application generates and transmits a DVR refusal that indicates a DVR program is not to be downloaded due to a storage limit user preference. Alternatively, the mobile DVR application may generate a user interface that warns the user that the storage space limit may be exceeded. The user may then override the limit, change the limit, request to stream the DVR program, or confirm that no further DVR programs are to be downloaded.

The cost associated with the storage and the management of the storage for a network-based DVR service can be tremendous. For example, a service provider that provides nationwide television service and a DVR service may be subject to recording and storing a million or more copies of a program (e.g., one copy for each DVR request). Given the number of DVR requests and programs to record and store, such a load may tax the service provider's network resources.

Figure 2B:
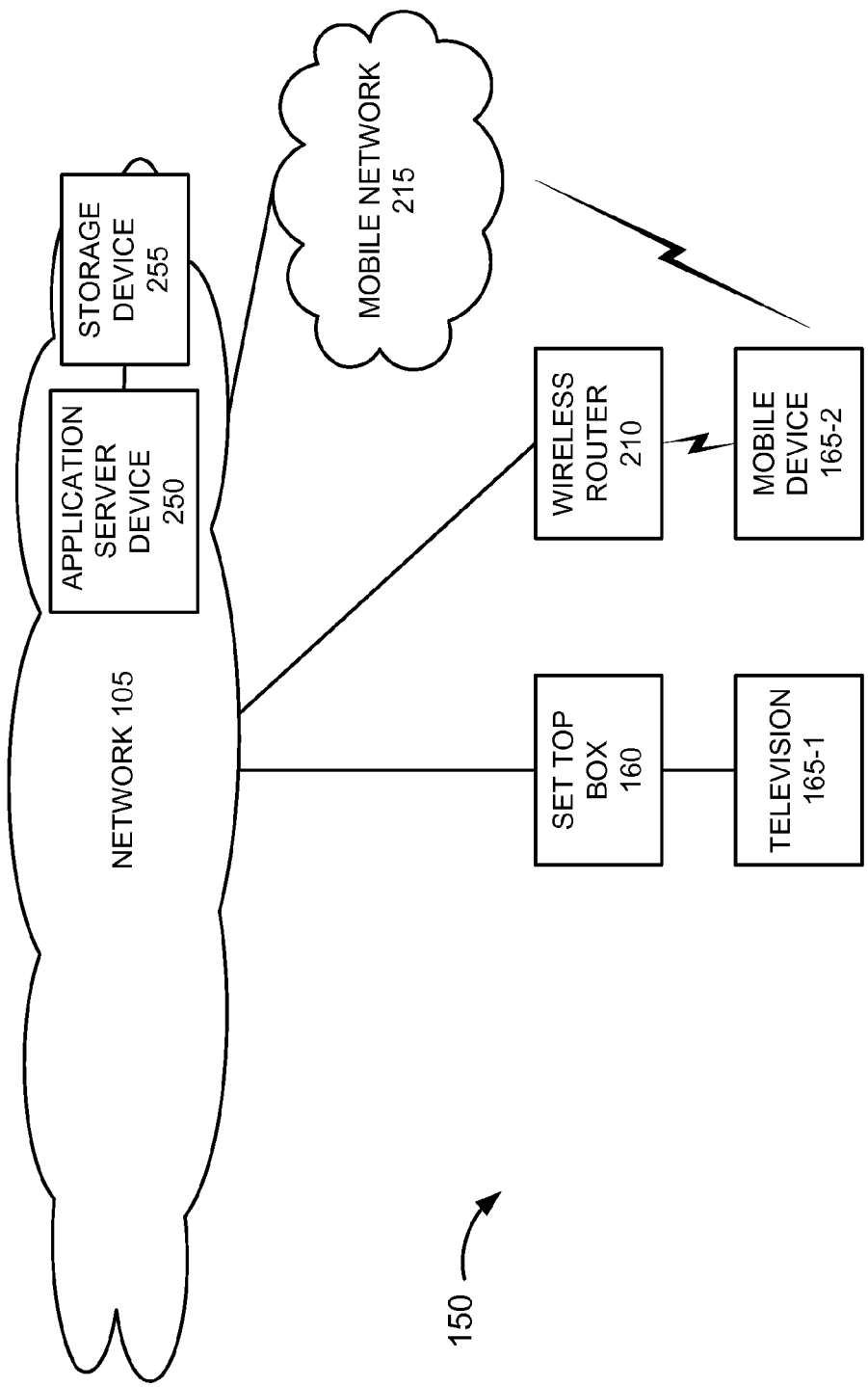

FIG. 2B is a diagram illustrating an exemplary environment in which an exemplary scenario pertaining to DVR program to mobile device is described. This environment includes devices similar to those described in FIG. 2A. However, network 105 includes an application server device 250 and a storage device 255. According to this exemplary environment, application server device 250 provides DVR program to mobile device functionalities, as described herein. Storage device 255 stores DVR programs pertaining to a DVR program to mobile device service.

According to an exemplary embodiment, application server device 250 uses pre-selection information to provide a DVR program to mobile device service. For example, set top box 160 records the program and application server device 250 and storage device 255 stores the DVR programs based on the pre-selection information. According to another embodiment, application server device 250 records and stores DVR programs based on the pre-selection information. In either approach, the number of DVR programs managed by application server device 250 and stored by storage device 255 may be minimized.

Referring to FIG. 2B, according to an exemplary scenario, assume that the user selects which DVR programs are to be managed and stored by application server device 250 and storage device 255 for mobile device consumption. According to an exemplary implementation, the user selects the DVR program via a user interface of the mobile DVR application. For example, assume that set top box 160 is scheduled to record a program or records a program based on a user request. The user request includes information pertaining to the program to be recorded (e.g., title, channel, time, etc.). Set top box 160 provides application server device 250 with the program information pertaining to a DVR program already recorded or to be recorded. Application server device 250 transmits the program information to mobile device 165-2. The mobile DVR application provides this information, via a user interface, to the user so the user is able to select which DVR program(s) he/she would like to receive via mobile device 165-2. The user's selection of a program (e.g., pre-selection information) for mobile consumption is transmitted from mobile device 165-2 to application server device 250.

According to other implementations, the mobile DVR application may obtain the user's selection of a program for mobile consumption according to other methods. For example, the user may input, via a user interface of the mobile DVR application, program information (e.g., title of a program, a program designated as a "favorite," etc.). The pre-selection information is communicated to application server device 250. According to the above approaches, the pre-selection information may be also provided to set top box 160. Alternatively, mobile device 165-2 and set top box 160 may establish a communication link without involving application server device 250.

According to another exemplary implementation, the user may indicate that a program is for mobile consumption via a user interface provided by set top box 160. For example, when the user selects a program to record, the user may indicate that the program is for mobile device consumption. Set top box 160 may transmit the pre-selection information to application server device 250. Additionally, for example, the user may select, via the user interface provided by set top box 160, whether the program is to be downloaded or streamed. Still further, the user interface may allow the user to indicate other settings pertaining to the DVR program to mobile device service. For example, the user may provide a trigger (e.g., a location, etc.) for invoking the DVR program to mobile device service with respect to this particular program. By way of example, the user selects a program for download, and indicates to initiate the DVR program to mobile device service when the user exits his/her workplace. According to an exemplary implementation, network 105 may invoke the service based on location information pertaining to mobile device 165-2. Alternatively, the trigger information and, program identifier and/or download preference information may be provided to mobile device 165-2 and used by the mobile DVR application.

According to an exemplary scenario, based on a DVR recording schedule, set top box 160 records the program designated for a DVR program to mobile device service. After the program is recorded, depending on a push or a pull communication, the pre-selection information may be used to store the DVR program selected for mobile consumption by storage device 255. For example, set top box 160 may push the recorded program to storage device 255 via application server device 250 based on the pre-selection information. Alternatively, application server device 250 may pull the DVR program from set top box 160 based on the pre-selection information. Application server device 250 may transcode the DVR program into a format compatible with mobile device 165-2 before storing the program in storage device 255.

Subsequently, the mobile DVR application of mobile device 165-2 initiates a DVR program to mobile device session with application server device 250. Similar to that previously described, the mobile DVR application may initiate the downloading or the streaming of the DVR program based on a triggering mechanism (e.g., time, location, combination thereof, etc.).

Figure 2C:
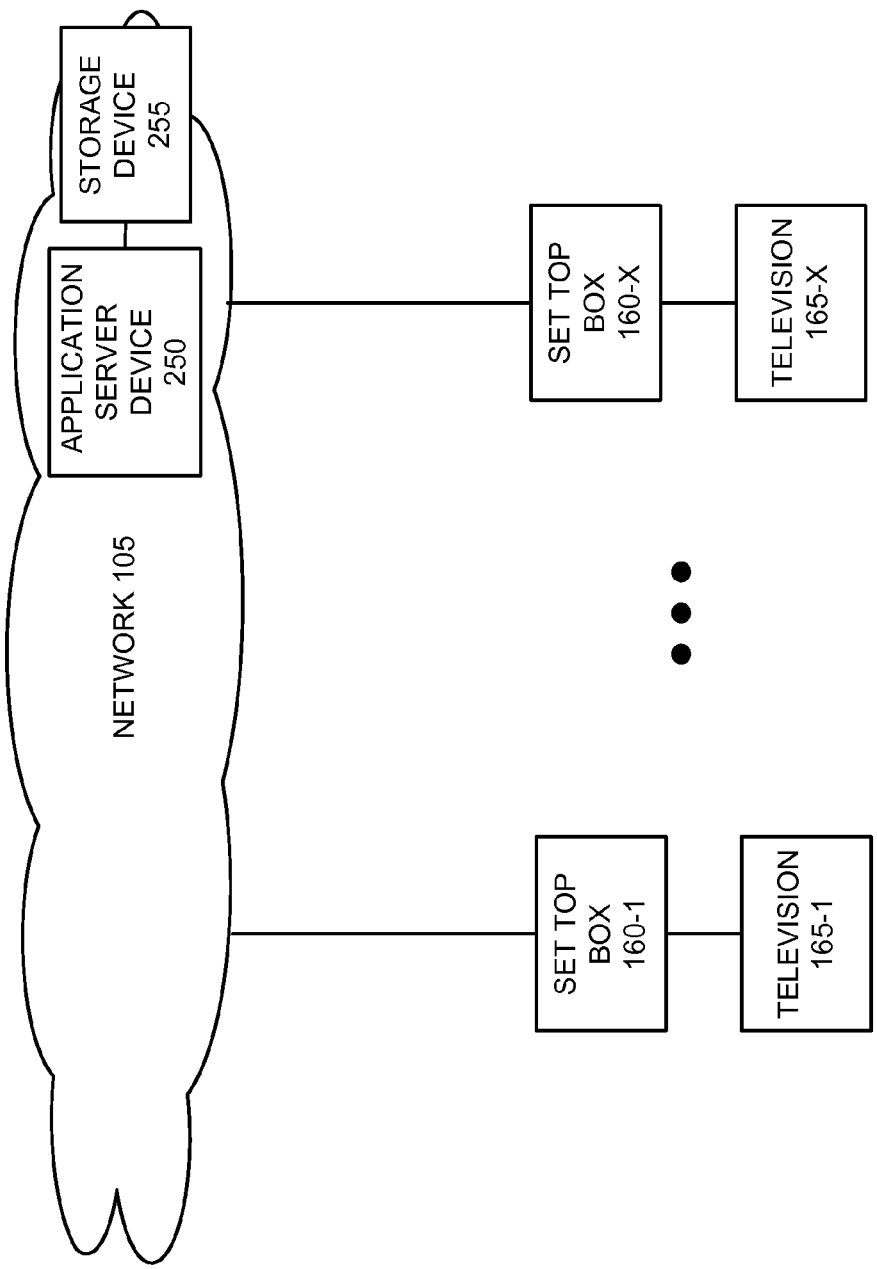

According to an exemplary embodiment, storage device 255 stores copies of programs equivalent to the number of active users of the DVR program to mobile device service. Referring to FIG. 2C, according to exemplary implementation, set top boxes 160 provide application server device 250 with DVR recording schedule information or program identifiers indicating programs recorded or to be recorded in relation to a DVR service.

Application server device 250 uses storage policies to select the number of copies of the DVR programs to be stored in storage device 255. According to an exemplary embodiment, the storage policies provide that a certain number of copies are stored to accommodate user requests that may be received in parallel. For example, assume that a program is recorded by 500,000 users. A storage policy may indicate that 10,000 copies of the DVR program are stored to accommodate user demand.

According to an exemplary embodiment, the storage policy is dynamic. For example, based on user request history, the number of copies stored may be reduced or increased. Although not illustrated in FIG. 2C, mobile devices 165 may obtain the DVR programs (e.g., via download, via stream) stored by storage device 255 according to approaches, as described herein. According to an exemplary embodiment, if a user did not request a recording of a program, the user is unable to download or stream the DVR program using the DVR program to mobile device service.

Referring to FIG. 2C, according to an exemplary embodiment, set top boxes 160 provide application server device 250 with DVR recording schedule information or program identifiers indicating programs recorded or to be recorded pertaining to a DVR service. Application server device 250 causes one copy of each program to be stored in storage device 255.

According to an exemplary embodiment, when application server device 250 receives a request to download or stream a DVR program for mobile device consumption, application server device 250 generates an additional copy of the DVR program based on the one copy stored. According to an exemplary implementation, when the request for the DVR program is to download the DVR program to mobile device 165, the additional copy is deleted after completion of the downloading. According to exemplary implementation, when the request for the DVR program is to stream the DVR program to mobile device 165, the additional copy is deleted after completion of the streaming. According to an exemplary implementation, if the request is to stream the DVR program and the entire DVR program is not provided to mobile device 165 (e.g., the user stops viewing the program before the end of the DVR program), the additional copy is deleted and program session information is stored. If at a later time, the user wishes to resume the viewing of the DVR program, application server device 250 generates another copy of the DVR program and program session information is used to continue to stream the DVR program at the point where the user stopped viewing the DVR program.

According to an exemplary embodiment, application server device 250 maintains the number of copies of a DVR program corresponding to the number of users that have downloaded and enabled the mobile DVR application. Similar to that described in the previous embodiment, application server device 250 deletes the copy of the DVR program once the DVR program has been downloaded or streamed.

FIG. 3 is a diagram illustrating exemplary components of a device 300 that may correspond to one or more of the devices depicted in the previous Figures. As illustrated, according to an exemplary embodiment, device 300 includes a processor 305, memory/storage 310, software 315, a communication interface 320, an input 325, and an output 330. According to other embodiments, device 300 may include fewer components, additional components, different components, and/or a different arrangement of components than those illustrated in FIG. 3 and described herein.

Processor 305 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., memory/storage 310), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 may include one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 may include an application or a program that provides a function and/or a process. Software 315 may include firmware. For example, interface device 160, application server device 205, and application server device 250 may be implemented with software 315. Additionally, for example, with reference to user device 165 may be implemented with software 315 (e.g., the mobile DVR application) to display user interfaces, communicate with interface device 160, network 105, application server device 205, etc. Additionally, for example, other devices may be implemented with software 315 to provide a function and/or a process described herein.

Communication interface 320 may permit device 300 to communicate with other devices, networks, systems, etc. Communication interface 320 may include one or multiple wireless interfaces and/or wired interfaces. Communication interface 320 may include one or multiple transmitters, receivers, and/or transceivers. Communication interface 320 may include a GPS receiver. Communication interface 320 may operate according to one or multiple protocols, standards, and/or the like.

Input 325 may permit an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 may permit an output from device 300. For example, output 330 may include a speaker, a display, a touchscreen, a touchless screen, a light, an output port, and/or some other type of visual, auditory, tactile, etc., output component.

According to an exemplary embodiment, interface device 160 receives programs from a distribution site of network 105 (e.g., local distribution site 120, etc.). Interface device 160 comprises tuners that permit interface device 160 to tune to particular programs (e.g., television channels, etc.) requested by users via user devices 165.

Device 300 may perform processes and/or functions, as described herein, in response to processor 305 executing software 315 stored by memory/storage 310. By way of example, instructions may be read into memory/storage 310 from another memory/storage 310 or read into memory/storage 310 from another device via communication interface 320. The instructions stored by memory/storage 310 may cause processor 305 to perform one or more processes described herein. Alternatively, for example, according to other implementations, device 300 may perform one or more processes described herein based on the execution of hardware (processor 305, etc.).

Figure 4:
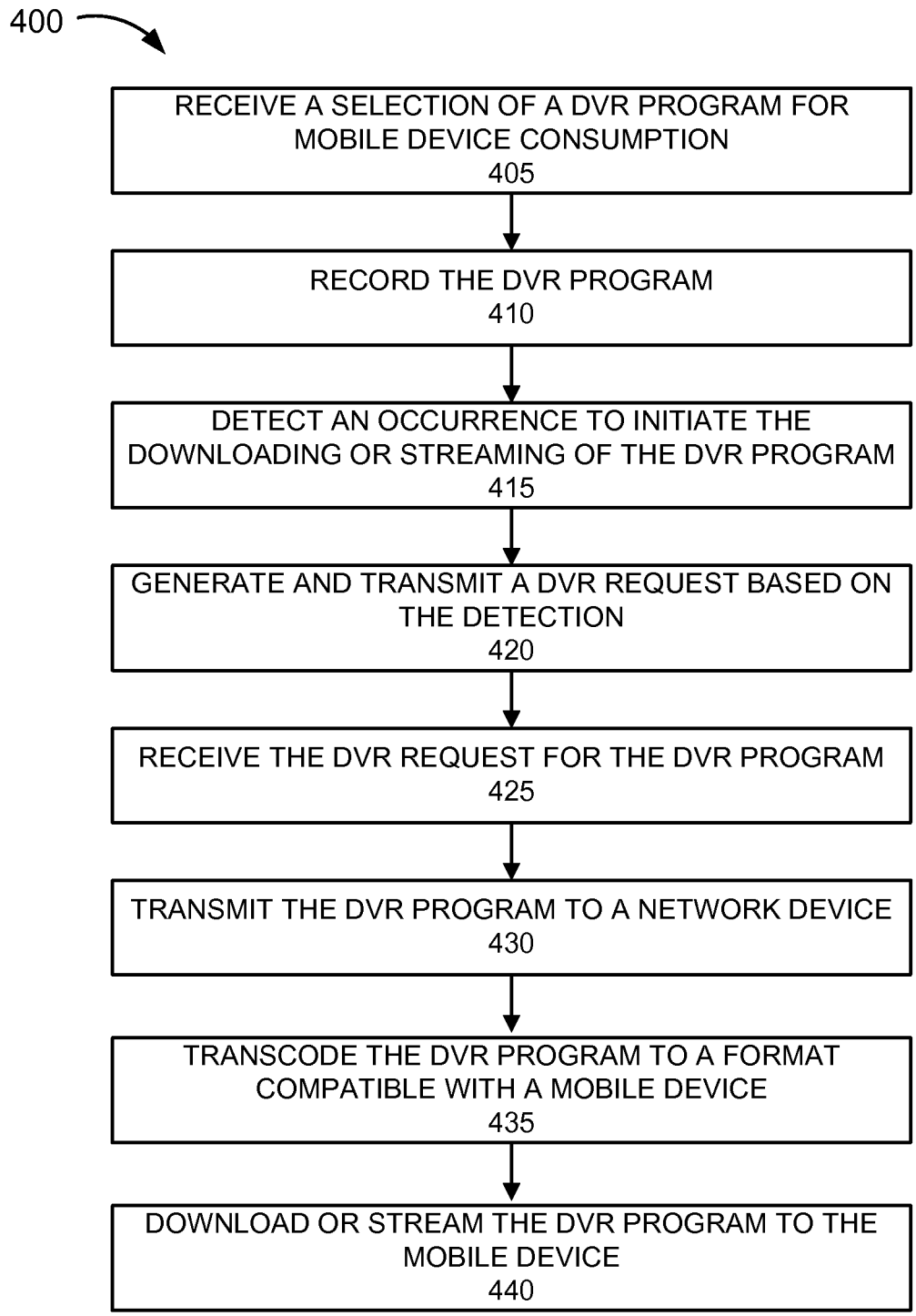
FIG. 4 is a flow diagram illustrating an exemplary process pertaining to DVR program to mobile device.

FIG. 4 is a flow diagram illustrating an exemplary process 400 pertaining to DVR program to mobile device, as described herein. A step or an act described in process 400 is performed by one of the devices illustrated in FIG. 1. For example, processor 305 may execute software 315 to perform the step or the act described.

Referring to FIG. 4, process 400 begins with receiving a selection of a DVR program for mobile device consumption (block 405). For example, a user may indicate, via a user interface of the mobile DVR application of mobile device 165, a DVR program for mobile consumption. The pre-selection information may be provided to set top box 160 and/or a network device (e.g., application server device 205, application server device 250).

In block 410, the DVR program is recorded. For example, set top box 160 records a program based on a user request and a DVR service. In block 415, an occurrence to initiate the downloading or the streaming of the DVR program is detected. For example, the mobile DVR application of mobile device 165 detects an occurrence to initiate a DVR program to mobile device service. By way of example, the occurrence may be when the user enters or leave his/her residence. Alternatively, the occurrence may be some other user-configured parameter (e.g., time, time and location, etc.).

In block 420, a DVR request is generated and transmitted based on the detection. For example, the mobile DVR application of mobile device 165 generates and transmits a DVR request to the network device (e.g., application server device 205, application server device 250).

In block 425, the DVR request for the DVR program is received. For example, the DVR request is received by the network device (e.g., application server device 205, application server device 250).

In block 430, the DVR program is transmitted to a network device. For example, the network device (e.g., application server device 205, application server device 250) obtains the DVR program from set top box 160. For example, in response to receiving the DVR request, the network device obtains the DVR program from set top box 160.

In block 435, the DVR program is transcoded to a format that is compatible with a mobile device. For example, the network device transcodes the DVR program to a format compatible with mobile device 165. The network device stores information pertaining to the capabilities of mobile device 165. The network device uses this information to select the appropriate format for transcoding.

In block 440, the DVR program is downloaded or streamed to the mobile device. For example, the network device downloads or streams the transcoded DVR program to mobile device 165. The network device stores information pertaining to the delivery of a DVR program (e.g., download, stream). The network device uses this information to provide the DVR program to mobile device 165 in the proper delivery manner.

Although FIG. 4 illustrates an exemplary process 400 to provide a DVR program to a mobile device, process 400 may include additional operations, fewer operations, and/or different operations than those illustrated in FIG. 4 and described herein. For example, process 400 may perform a DVR program to mobile device step or act in a manner that is different from a step or an act described in FIG. 4 depending on the circumstances, user preferences, requests made by a user, etc.

The foregoing description of embodiments provides illustration, but is not intended to be exhaustive or to limit the embodiments to the precise form disclosed. Accordingly, modifications to the embodiments described herein may be possible. For example, according to other embodiments, one or more processes or sub-processes (e.g., a step) may be performed by a device other than interface device 160. For example, the network device (e.g., application server device 205, application server device 250) may perform one or more of the steps or acts described herein. According to yet other embodiments, other modifications may be performed. For example, set top box 160 may not provide application server device 205 with the DVR program. Rather, in response to receiving a DVR request, set top box 160 provides the program identifier of the DVR program to application server device 205. Application server device 205 obtains the DVR program in network 105, transcodes the DVR program, and provides the DVR program to mobile device 165-2.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 305, etc.) or a combination of hardware and software (e.g., software 315). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 310.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
   receiving, by a customer premises equipment, a request to record a program in relation to a digital video recorder (DVR) service;
   recording, by the customer premises equipment, the program based on the request;
   storing, by the customer premises equipment, the program in a video and audio compression codec format that is incompatible with a mobile device;
   receiving, via a user interface, a user preference configured by a user of a DVR program to mobile device service;
   storing the user preference that causes an automatic invocation of the DVR program to mobile device service, wherein the DVR program to mobile device service includes a downloading or a streaming of the program from a network device to the mobile device, wherein the user preference indicates a time of day and a location that the mobile device is to receive the program, and wherein the time of day indicates a time window comprising a start time and an end time during which the program can begin to be received by the mobile device;
   detecting when the user preference is satisfied in relation to the mobile device, subsequent to the storing of the user preference;
   receiving, by the network device, a DVR request for the program in response to the detecting;
   selecting the program in response to receiving the DVR request;
   selecting a video and audio compression codec format that is compatible with the mobile device;
   transcoding the program to the video and audio compression codec format that is compatible with the mobile device; and
   downloading or streaming, by the network device, the transcoded program to the mobile device.

2. The method of claim 1, wherein the location is a location outside of a customer premises associated with the customer premises equipment, and the user preference indicates whether the program is to be downloaded or streamed, and wherein the network device is outside of the customer premises associated with the customer premises equipment, and wherein the DVR request includes data indicating the video and audio compression codec format that is compatible with the mobile device.

3. The method of claim 1, further comprising:
   uploading, by the customer premises equipment, the program to the network device, in response to receiving a DVR request, wherein the video and audio compression codec format that is incompatible with the mobile device is a Moving Picture Experts Group 2 (MPEG-2) format and the video and audio compression codec format that is compatible with the mobile device is one of an H.264 format or an MPEG-4 format.

4. The method of claim 3, wherein the receiving the request to record comprises:
   receiving the request that includes information indicating that the program is designated for the DVR program to mobile device service, wherein storing the program comprises:
   storing the information that indicates that the program is designated for the DVR program to mobile device service; and wherein the uploading comprises:
   selecting the program to upload based on the information.

5. The method of claim 1, further comprising:
   receiving DVR information that indicates programs to be recorded;
   generating a user interface, based on the DVR information, that includes information indicating programs available for the DVR program to mobile device service; and receiving, via the generated user interface, a user selection of the program, wherein the program is one of the programs available for the DVR program to mobile device service.

6. The method of claim 1, further comprising:
storing, by the mobile device, a user preference pertaining to an amount of storage allocated for storing DVR programs;
identifying, by the mobile device, whether a threshold amount of the amount of storage allocated for storing DVR programs is satisfied, wherein when the threshold amount is satisfied, the downloading of the program is not permitted;
determining, by the mobile device, whether the program is to be downloaded or streamed in response to identifying that the threshold amount of the amount of storage allocated for storing DVR programs is satisfied; and
refusing, by the mobile device, the downloading of the program in response to determining that the program is to be downloaded.

7. The method of claim 1, further comprising:
storing mobile device capability information, and wherein the transcoding comprises:
transcoding the program to the video and audio compression codec format that is compatible with the mobile device based on the mobile device capability information.

8. The method of claim 1, further comprising:
obtaining, by the network device, location information pertaining to the mobile device; and
matching, by the network device, the location information with the user preference that indicates the location for the automatic invocation of the DVR program to mobile device service, and wherein the user preference indicates whether the program is to be stored by the customer premises equipment or stored by the network device.

9. A non-transitory storage medium storing instructions executable by a processor of a device, wherein the instructions comprise instructions to:
provide a user interface that allows a user to record a program in relation to a digital video recorder (DVR) service provided by a customer premises equipment;
receive a request to record the program via the user interface;
record the program in a video and audio compression codec format that is incompatible with a mobile device;
receive a user preference configured by the user of a DVR program to mobile device service;
store the user preference that causes an automatic invocation of the DVR program to mobile device service, wherein the DVR program to mobile device service includes a downloading or a streaming of the program from a network device to the mobile device, wherein the user preference indicates a time of day and a location that the mobile device is to receive the program and whether the program is to be downloaded or streamed, and wherein the time of day indicates a time window comprising a start time and an end time during which the program can begin to be received by the mobile device;
detect when the user preference is satisfied subsequent to the user preference being stored;
transmit a DVR request to the network device for the program in response to a detection that the user preference is satisfied; and receive the program from the network device in response to a transmission of the DVR request, wherein the program is in a video and audio compression codec format that is compatible with the mobile device.

10. The non-transitory storage medium of claim 9, wherein the user interface allows the user to designate the program to be recorded for the DVR program to mobile device service, and wherein the instructions further comprise instructions to:
receive, via the user interface, a user request to designate the program for the DVR program to mobile device service, and wherein the location is a location outside of a customer premises.

11. The non-transitory storage medium of claim 10, the instructions comprise instructions to:
store a user preference pertaining to an amount of storage allocated for storing programs;
identify whether a threshold amount of the amount of storage allocated is satisfied;
determine whether the program is to be downloaded or streamed in response to an identification that the threshold amount of the amount of storage allocated is satisfied; and
refuse a downloading of the program in response to a determination that the program is to be downloaded.

12. The non-transitory storage medium of claim 9, wherein the DVR request includes information indicating the program, and the instructions comprise instructions to:
obtain location information pertaining to the mobile device; and
match the location information with the user preference that indicates the location for the automatic invocation of the DVR program to mobile device service, and wherein the DVR request indicates the video and audio compression codec format that is compatible with the mobile device.

13. A system comprising:
a communication interface;
a memory, wherein the memory stores instructions; and
a processor, wherein the processor executes the instructions to:
provide a user interface that allows a user to record a program in relation to a digital video recorder (DVR) service;
receive a request to record the program via the user interface;
record the program in a video and audio compression codec format that is incompatible with a mobile device;
receive a user preference configured by the user of a DVR program to mobile device service;
store the user preference that causes an automatic invocation of the DVR program to mobile device service, wherein the DVR program to mobile device service includes a downloading or a streaming of the program from a network device to the mobile device, wherein the user preference indicates a time of day and a location that the mobile device is to receive the program and whether the program is to be downloaded or streamed, and wherein the time of day indicates a time window comprising a start time and an end time during which the program can begin to be received by the mobile device;
detect when the user preference is satisfied subsequent to the user preference being stored;

transmit, via the communication interface, a DVR request to the network device for the program in response to the detection that the user preference is satisfied; and receive, via the communication interface, the program from the network device in response to a transmission of the DVR request, wherein the program is in a video and audio compression codec format that is compatible with the mobile device.

14. The system of claim 13, wherein the processor further executes the instructions to:

store mobile compatibility information pertaining to the mobile device;

receive the DVR request;

select the program in response to the receipt of the DVR request;

select the video and audio compression codec format that is compatible with the mobile device based on the mobile compatibility information;

transcode the program to the video and audio compression codec format that is compatible with the mobile device; and download or stream, via the communication interface, the transcoded program to the mobile device.

15. The system of claim 13, wherein the processor further executes the instructions to:

determine whether the time of day and the location match the user preference; and generate the DVR request in response to a determination that the time of day and the location match the user preference.

16. The system of claim 15, wherein the DVR request indicates the program and a type of program delivery, wherein the type of program delivery indicates whether the program is to be downloaded or streamed, and wherein the user preference indicates whether the program is to be stored by a customer premises equipment or the network device, and wherein the network device is outside of the customer premises associated with the customer premises equipment.

17. The system of claim 13, wherein the processor further executes the instructions to:

store a user preference pertaining to an amount of storage allocated for storing programs;

identify whether a threshold amount of the amount of storage allocated is satisfied, wherein when the threshold amount is satisfied, a downloading of the program is not permitted;

determine whether the program is to be downloaded or streamed in response to an identification that the threshold amount is satisfied; and refuse to receive the program in response to a determination that the program is to be downloaded.

18. The system of claim 13, wherein the processor further executes the instructions to:

store a user preference pertaining to an amount of storage allocated for storing programs;

identify whether a threshold amount of the amount of storage allocated is satisfied, wherein when the threshold amount is satisfied, a downloading of the program is not permitted;

determine whether the program is to be downloaded or streamed in response to an identification that the threshold amount is satisfied; and wherein the receiving comprises:

receive, via the communication interface, the program via a streaming transmission in response to a determination that the program is to be streamed.

19. The system of claim 13, wherein the processor further executes the instructions to:

record the program; and upload, via the communication interface, the program to the network device.

20. The system of claim 19, wherein the processor further executes the instructions to:

receive a request that includes information indicating that the program is designated for the DVR program to mobile device service;

store the information that indicates the program is designated for the DVR program to mobile device service; and wherein when uploading, the processor further executes the instructions to:

select the program to upload based on the information.

* * * * *